United States Patent
Gnech et al.

(10) Patent No.: US 10,250,543 B2
(45) Date of Patent: Apr. 2, 2019

(54) DEDUPLICATION OF E-MAIL CONTENT BY AN E-MAIL SERVER

(71) Applicant: International Business Machines Corporation, Armonk, NY (US)

(72) Inventors: Thomas H. Gnech, Herrenberg (DE); Eric Kass, Mannheim (DE); Michael H. Schlachter, Metzingen (DE); Andreas Uhl, Gaufelden (DE); Barbara Wald, Schoenbuch (DE)

(73) Assignee: International Business Machines Corporation, Armonk, NY (US)

( * ) Notice: Subject to any disclaimer, the term of this patent is extended or adjusted under 35 U.S.C. 154(b) by 379 days.

(21) Appl. No.: 14/921,194

(22) Filed: Oct. 23, 2015

(65) Prior Publication Data
US 2017/0118149 A1    Apr. 27, 2017

(51) Int. Cl.
*G06F 15/16* (2006.01)
*H04L 12/58* (2006.01)

(52) U.S. Cl.
CPC ............ *H04L 51/22* (2013.01); *H04L 51/063* (2013.01); *H04L 51/08* (2013.01)

(58) Field of Classification Search
CPC ........ H04L 51/066; H04L 51/08; H04L 51/22
USPC ................................................. 709/206, 203
See application file for complete search history.

(56) References Cited

U.S. PATENT DOCUMENTS

| | | | | |
|---|---|---|---|---|
| 7,945,029 | B1* | 5/2011 | Wageman | H04M 3/53325 379/88.25 |
| 8,214,443 | B2* | 7/2012 | Hamburg | G06Q 10/107 709/206 |
| 8,458,263 | B1* | 6/2013 | Ruben | H04L 12/586 707/661 |
| 8,458,269 | B2 | 6/2013 | Friedman et al. | |
| 9,137,185 | B2* | 9/2015 | Costenaro | H04L 67/2857 |
| 9,158,855 | B2* | 10/2015 | Glance | G06F 17/30587 |
| 9,253,137 | B1* | 2/2016 | Jackson | H04L 51/32 |
| 9,559,999 | B1* | 1/2017 | Auchmoody | H04L 51/16 |
| 9,645,724 | B2* | 5/2017 | Matas | G06F 3/04883 |
| 2006/0240824 | A1* | 10/2006 | Henderson | H04L 51/04 455/435.1 |
| 2010/0082713 | A1 | 4/2010 | Frid-Nielsen et al. | |
| 2011/0035503 | A1* | 2/2011 | Zaid | H04L 63/0407 709/228 |
| 2011/0302250 | A1* | 12/2011 | Plotts | H04L 12/586 709/206 |

(Continued)

OTHER PUBLICATIONS

IBM, "Method for Transmitting File Attachments to Shared Storage", IP.com No. 000173722, Aug. 21, 2008, pp. 1-4.

(Continued)

*Primary Examiner* — Duyen M Doan
(74) *Attorney, Agent, or Firm* — Dmitry Paskalov (57) ABSTRACT

A method for handling e-mail communication by an e-mail server is provided. The method includes receiving an e-mail by the e-mail server, parsing the e-mail to identify a large content item within the e-mail, generating a modified e-mail by replacing the large content item within the e-mail with an identifier, storing the large content item and the large content item forms a basis for a weblog associated with the identifier, sending the modified e-mail, and receiving a reply e-mail to the modified e-mail and the content of the reply e-mail builds an extension to the weblog.

20 Claims, 6 Drawing Sheets

(56) References Cited

U.S. PATENT DOCUMENTS

| | | |
|---|---|---|
| 2012/0191794 A1 | 7/2012 | Jensen et al. |
| 2013/0290435 A1* | 10/2013 | Martin .................. H04L 51/28 709/206 |
| 2014/0046911 A1 | 2/2014 | Roomp et al. |
| 2014/0122620 A1 | 5/2014 | Lin et al. |
| 2015/0012808 A1 | 1/2015 | Ernest et al. |
| 2016/0119349 A1* | 4/2016 | Wang ..................... H04L 63/10 713/168 |

OTHER PUBLICATIONS

IBM, "A Method for Emailing File Attachments As Links", IP.com No. 000133761, Feb. 8, 2006, p. 1.

* cited by examiner

DEDUPLICATION OF E-MAIL CONTENT BY AN E-MAIL SERVER

BACKGROUND

The invention relates generally to a method for e-mail communication, and more specifically, to a method for handling e-mail communication by an e-mail server. The invention further relates to a computing system and a computer program product for handling e-mail communication by an e-mail server.

In today's interconnected world, e-mail communication plays a significant role in the traffic over the Internet. Many e-mails are sent to a large number of recipients. This may cause a large burden for involved e-mail clients and e-mail services because e-mails, including partially large attachments or potentially large e-mail bodies, are stored in the mailbox of each individual recipient as well as any replicated form on an e-mail server. This may require a lot of storage space for the various copies and thus a waste of computing and storage resources. Replies to all recipients of a distribution list result in even more copies. For example, the same content may be stored 10 or 20 times and thus, may require 10 or 20 times as much storage space in a computer network compared to the original e-mail.

SUMMARY

According to one embodiment, a method for handling e-mail communication by an e-mail server is provided. The method may include receiving an e-mail by the e-mail server, parsing the e-mail to identify a large content item within the e-mail, generating a modified e-mail by replacing the large content item within the e-mail with an identifier, storing the large content item and the large content item forms a basis for a weblog associated with the identifier, sending the modified e-mail, and receiving a reply e-mail to the modified e-mail and the content of the reply e-mail builds an extension to the weblog.

According to another embodiment, a computer program product for handling e-mail communication by an e-mail server is provided. The computer program product may include at least one computer readable non-transitory storage medium having computer readable program instructions for execution by a processor. The computer readable program instructions may include instructions for receiving an e-mail by the e-mail server, parsing the e-mail to identify a large content item within the e-mail, generating a modified e-mail by replacing the large content item within the e-mail with an identifier, storing the large content item and the large content item forms a basis for a weblog associated with the identifier, sending the modified e-mail, and receiving a reply e-mail to the modified e-mail and the content of the reply e-mail builds an extension to the weblog.

According to another embodiment, a computer system for handling e-mail communication by an e-mail server is provided. The system may include at least one processing unit, at least one computer readable memory, at least one computer readable tangible, non-transitory storage medium, and program instructions stored on the at least one computer readable tangible, non-transitory storage medium for execution by the at least one processing unit via the at least one computer readable memory. The program instructions may include instructions for receiving an e-mail by the e-mail server, parsing the e-mail to identify a large content item within the e-mail, generating a modified e-mail by replacing the large content item within the e-mail with an identifier, storing the large content item and the large content item forms a basis for a weblog associated with the identifier, sending the modified e-mail, and receiving a reply e-mail to the modified e-mail and the content of the reply e-mail builds an extension to the weblog.

BRIEF DESCRIPTION OF THE SEVERAL VIEWS OF THE DRAWINGS

It should be noted that embodiments of the invention are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

Preferred embodiments of the invention will be described, by way of example only, and with reference to the following drawings.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

The proposed method for e-mail handling by an e-mail server may work independently from specific e-mail clients and therefore may work between users on different e-mail systems, e.g., e-mail systems lacking a control connection to a common e-mail server. Conventional deduplication solutions for an e-mail communication with multiple client systems may require a control connection to a common (controlling) e-mail server.

The present invention may maintain a unified view of intricate e-mail conversations comprising nested levels of reply and forward on the e-mail server, which may be visible within specially crafted e-mail bodies sent from recipients. The present invention, e.g., an e-mail server according to an embodiment, may have e-mail correspondence directed through itself (e.g., via e-mail address spoofing). According to an embodiment, the e-mail server has an omnipresent view of the complexity and length of the resulting documents and an ability to track senders and recipients. According to another embodiment, the e-mail server may (centrally) perform lifecycle management of documents, such as e-mail attachments or e-mails themselves, including document retention and disposal.

Users may decide to unsubscribe from an e-mail thread, e.g., an e-mail thread with a large number of recipients. If other e-mail recipients performed a "reply to all" the e-mail client having made the unsubscribe request/command may not receive such reply e-mail. The embodiments disclosed herein may give users better control of e-mail clients, in particular with respect to resource management of client resources.

Figure 1:
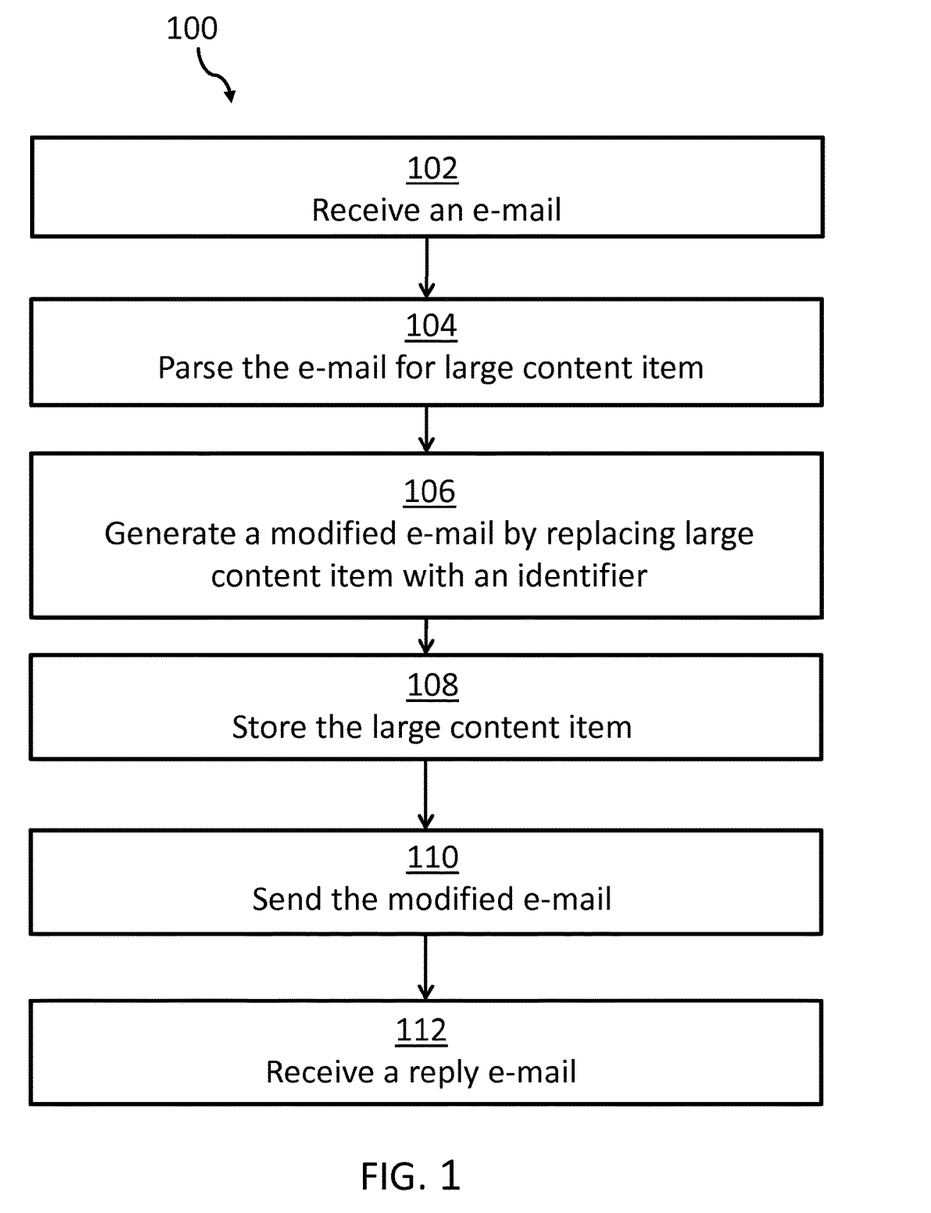
FIG. 1 is a flowchart illustrating a method for handling e-mail communication by an e-mail server, according to an embodiment.

FIG. 1 is a flowchart illustrating an embodiment of the method (e.g., method 100) for handling e-mail communication by an e-mail server (e.g., an enhanced e-mail server), according to an embodiment. At 102, an e-mail may be received by the e-mail server, and in particular, may be sent from an e-mail client. The e-mail server disclosed herein may be considered an enhanced e-mail server. The e-mail server may be a software system being executed on a hardware server able to receive electronic messages (e-mails) and re-distribute them according to a target or recipient address field. The e-mail server may function based on standard protocols, e.g., including but not limited to SMTP (simple mail transfer protocol) or POP/IMAP (post office protocol/Internet message access protocol). It will be appreciated that other message protocols are not excluded.

At 104, the received e-mail may be parsed for large content items (e.g., large attachments or larger content items of an e-mail itself) by the e-mail server. A large content item may be a component of an e-mail which may, e.g., be an attachment to the e-mail. However, an e-mail itself may have a sufficiently large size (measured in number of bytes) and may be considered a large content item. It may be possible that also a part of an e-mail or the complete e-mail may be defined as the large content item. It will be appreciated that there is no lower limit of the number of bytes for a large content item in the context of this application, but may be a predetermined value. Any content component of an e-mail may be treated as a large content item in the context of this application. It is contemplated that a large content item designation may, e.g., also apply to a small e-mail or an e-mail reply to an e-mail, i.e., an e-mail reply with just one word.

At 106, a modified e-mail may be generated, e.g., by the e-mail server, by replacing a large content item within the received e-mail with an identifier. The identifier may denote a URL (universal resource locator) for the large content item. For example, the large content item may be stored at a storage location, and the identifier may be associated with the storage location for the large content item. Such an identifier may be a specific URL of type http:// (hypertext transfer protocol). The modified e-mail may be an e-mail that may have been received by an e-mail server and in which a large content item within the e-mail has been replaced by an identifier.

At 108, the identified large content item may be stored locally, e.g., on a server upon which the e-mail service is executed, or at any other known or contemplated storage location, e.g., a database located offsite. The large content item may form a basis for a weblog, a.k.a. Blog. A weblog may be a Web site on a Web server that may be a series of content entries, e.g., arranged in reverse chronological order. The content may often be updated with new and additional information about a particular topic. A weblog may also be denoted as a Blog and is a well-known Internet technique for sharing information. The weblog, as disclosed herein, may be used for storing large content items that relate to e-mails.

At 110, the modified e-mail may be sent, e.g., to one or more recipients.

At 112, a reply e-mail to the modified e-mail may be received, e.g., by the e-mail server. The e-mail server may be adapted for using the identifier to position content of the reply e-mail in weblog. In other words, the content of the reply e-mail may be used to build an extension to (or extend) the weblog. For example, the content of a reply e-mail may serve as a subsequent entry of a weblog containing a previous entry that may be associated with the large content item.

In one embodiment, the identifier may include at least one of the following: a thread identifier, a content identifier, and a security token. The thread identifier may be used to position content in the weblog. For example, the thread identifier may be associated with a position in the weblog associated with content of a reply e-mail. The identifier may be a combination of a thread identifier, a content identifier, and a security token. The identifier may be used for different purposes, such as providing identification, building a relationship between an e-mail and a large content item, and securing access to the large content item. For example, with respect to securing access, the identifier may limit access to the large content items to authorized recipients of e-mails associated with the large content items or the identifier.

A thread identifier, such as a communication thread identifier, may be a feature used by one or multiple e-mail clients, bulletin boards, newsgroups, and Internet forums in which software aids users by visually grouping messages with their replies. These groups are called a conversation, topic thread, or simply a thread. A discussion forum, e-mail client or news client is said to have a "conversation view", "threaded topics" or a "threaded mode" if messages can be grouped in this manner. Threads can be displayed in a variety of different ways.

A content identifier may be a unique keyword or series of characters to identify a specific content item. The content identifier may be generated automatically, e.g., by the e-mail server, a server associated with the weblog, etc.

A security token may be a unique keyword or a series of characters. A security token, as disclosed herein, may be generated in a specific way as described below. A security token may limit access to a large content item to only an authorized user or recipient of an e-mail associated with the large content item.

In one embodiment, the security token is a nonce E, i.e., a number used once, formed by an encryption function, which may be defined as:

$$E=\text{encrypt}(\text{hash}(\text{recipient-ID})|\text{content-ID}|\text{time})|\text{time}).$$

As used in the above encryption function, recipient-ID is an identifier of a recipient of the modified e-mail, content-ID is the identifier of the large content item, and time is a time-stamp associated with a sending time of the modified e-mail by the e-mail server. It may be noted that storing the security token may be controlled by the e-mail server.

A nonce may be used once for identification purposes and afterwards may become irrelevant.

In one embodiment, the e-mail server may communicate using a protocol (e.g., simple mail transfer protocol (SMTP)) for a transmission of electronic messages, a.k.a. e-mail, over a network, e.g., the Internet. An RCTP command recipient (e.g., a corresponding RCTP command recipient of the SMTP communication) is a recipient of the received e-mail, in particular the reply address, and a corresponding TO: field header of the SMTP communication may refer to a replaced, i.e., spoofed, recipient at the e-mail server. The original reply address may be replaced by the e-mail server (e.g., an enhanced or deduplication e-mail server) to take control and extend the Blog. Each reply to an e-mail (e.g., the modified e-mail) may add content to the weblog, i.e., Blog, that is related to a corresponding e-mail thread.

As disclosed herein, an RCTP command may include a specific command as part of the SMTP communication. The RCTP command may be dedicated to the recipient of an e-mail and in particular to the address line starting with "To:".

In one embodiment, the large content item may be stored as part of an e-mail client. As such, a user or recipient of an email may have all content of an e-mail thread locally available and the user or recipient may not require a network connection to access the content.

In one embodiment, access—in particular, by an e-mail recipient—to the large content item may be granted by the e-mail server if the e-mail server validates the access (e.g., an access request may be granted after validation of the access request) by reconstructing an outcome of the encryption function E using the recipient-ID, the content-ID and the time. This function may be the same function E as used during the extraction of the large content item when parsing the e-mail (e.g., the email received at 102 in FIG. 1). Hence, a recipient of an e-mail having an identifier for a large content item included in the recipient's e-mail may access the large content item belonging to recipient's e-mail on a weblog server related to the e-mail server in a secure way. The security token may be reconstructed by the e-mail server using information provided by the receiving e-mail client, i.e., the recipient-ID, the content-ID and a timestamp, in particular the timestamp when the modified e-mail was originally sent.

In one embodiment, parsing the e-mail for large content items may include determining a number of recipients for the e-mail and/or determining a size of the large content item within the e-mail, and replacing the large content item within the e-mail with an identifier may be based on the number of recipients being above a recipient threshold number and/or may be based on the size (e.g., measured in bytes) of the large content item being above a threshold size. The recipient threshold number and the threshold size may be predetermined values.

For example, small e-mails (in terms of bytes) with a small number of recipients, e.g., below a recipient threshold value, may lack replacements of large content items, but small e-mails (below a threshold size) with a large number of recipients, e.g., above a recipient threshold value, may be disassembled and the content of the e-mail (e.g., e-mail body, large content item(s), etc.) may be stored on a weblog. Recipients of the disassembled e-mail would access the e-mail contents stored in the weblog via the identifier, which may be part of the e-mail. In this way, recipients may retrieve the complete e-mail from the weblog.

In one embodiment, the e-mail server may receive an unsubscribe command for a corresponding e-mail thread, and, based on the unsubscribe command, the e-mail server may remove the recipient of the corresponding e-mail thread from a group of recipients of a subsequent modified e-mail associated with the corresponding e-mail.

Recipients of such disassembled e-mails in the example above may unsubscribe from the large recipient distribution list because these e-mails may be routed through an e-mail server, according to an embodiment, adapted for handling an assembly of the e-mail body and the larger content item via the identifier (e.g., by spoofing the unsubscribing recipient's address). In accordance with this example, the amount of data sent over the network may be reduced significantly. Additionally, in one embodiment, the large content items may need not be stored under the control of a local e-mail client.

In one embodiment, an entire e-mail body (e.g., an e-mail body for the e-mail received at 102 in FIG. 1) may be treated as the large content item and stored by the e-mail server and replaced by the identifier in the modified e-mail. The identifier may lead to the entire stored document (i.e., the original entire e-mail body), which may appear in the body of the modified e-mail when viewed by a recipient. This may make e-mail communication more efficient because less information may be sent over the network, in particular if a content-wise small e-mail reply is sent to an e-mail comprising a large content item. The contents of the e-mail reply contained in the e-mail body of the e-mail reply may be limited the identifier. Such a replacement method may be performed with little or no indication to the recipient of the replacement (of the original e-mail body contents with an identifier to the stored e-mail body contents). In other words, the modified e-mail may appear identical to a regular (unmodified) form of the e-mail. In this way, the replacement process (i.e., replacing a large content item with an identifier and providing the identifier) may not be detectible by or noticeable to the recipient.

In one embodiment, the e-mail server may receive an 'unsubscribe' command for the weblog. In this case, the e-mail server may stop sending modified e-mails of a corresponding thread to an originator of the 'unsubscribe' command, as discussed above.

In one embodiment, the weblog may be accessible to one or more recipients of the modified e-mail and one or more members of an e-mail discussion associated with the modified e-mail, the weblog may include one or more entries associated with the identifier, and access to the one or more entries may be limited to the one or more recipients of the modified e-mail. For example, all entries in the weblog relating to an identifier—in particular, the original identifier having been the basis for the related weblog thread entries—may be accessible by all users, e.g., members of an e-mail discussion. Alternatively, entries in the weblog relating to the identifier may be accessible only to recipients of a modified e-mail (i.e., those to whom the modified e-mail has been addressed), but not other members of an e-mail discussion associated with the modified e-mail (i.e., those to whom the modified e-mail has not been addressed). This may increase security and governance policies securing a potentially confidential email exchange.

Figure 2:
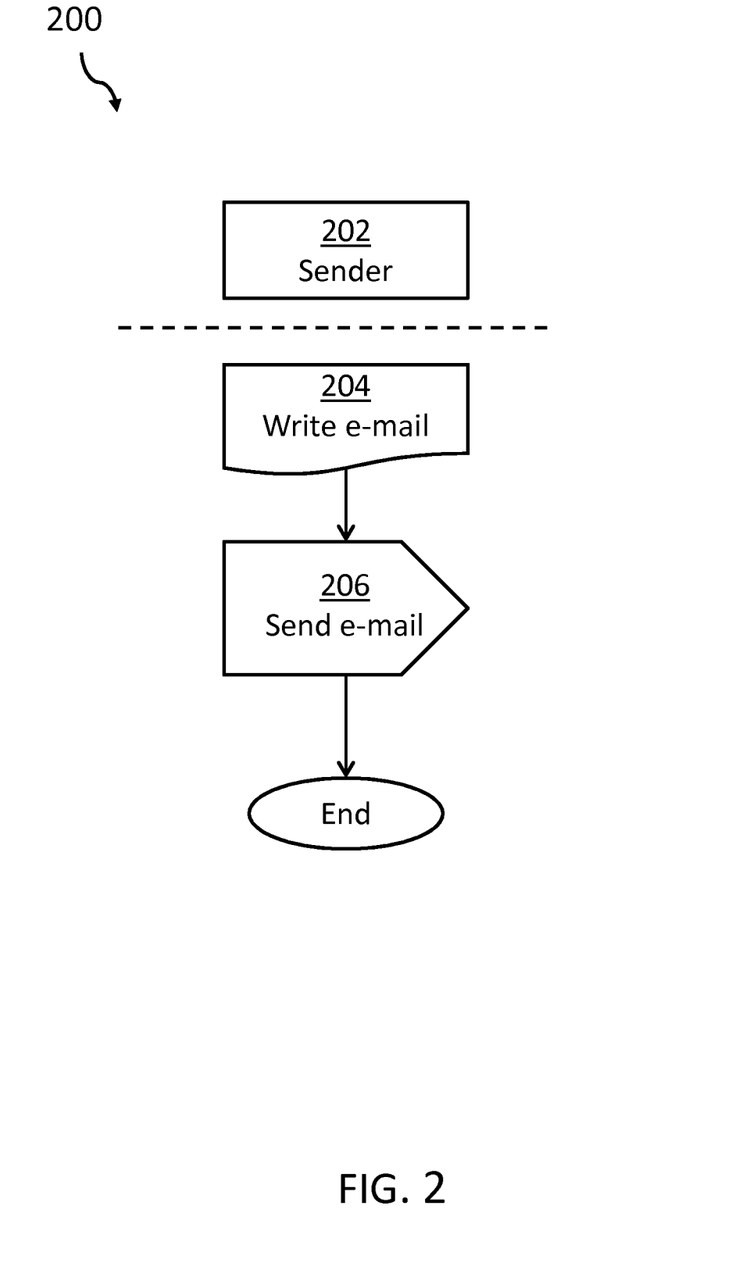
FIG. 2 is a flowchart illustrating aspects of a method for handling e-mail communication by an e-mail server from a sender perspective, according to an embodiment.

FIG. 2 is a flowchart illustrating aspects of an exemplary method for handling e-mail communication by an e-mail server from a sender's perspective 200. The sender 202 may write an original e-mail 204. At 206, the sender may send the original e-mail via the enhanced e-mail server, as discussed above. The sender may send the original e-mail from any e-mail client, and the sender's existing e-mail client may not require any changes or modifications.

Figure 3:
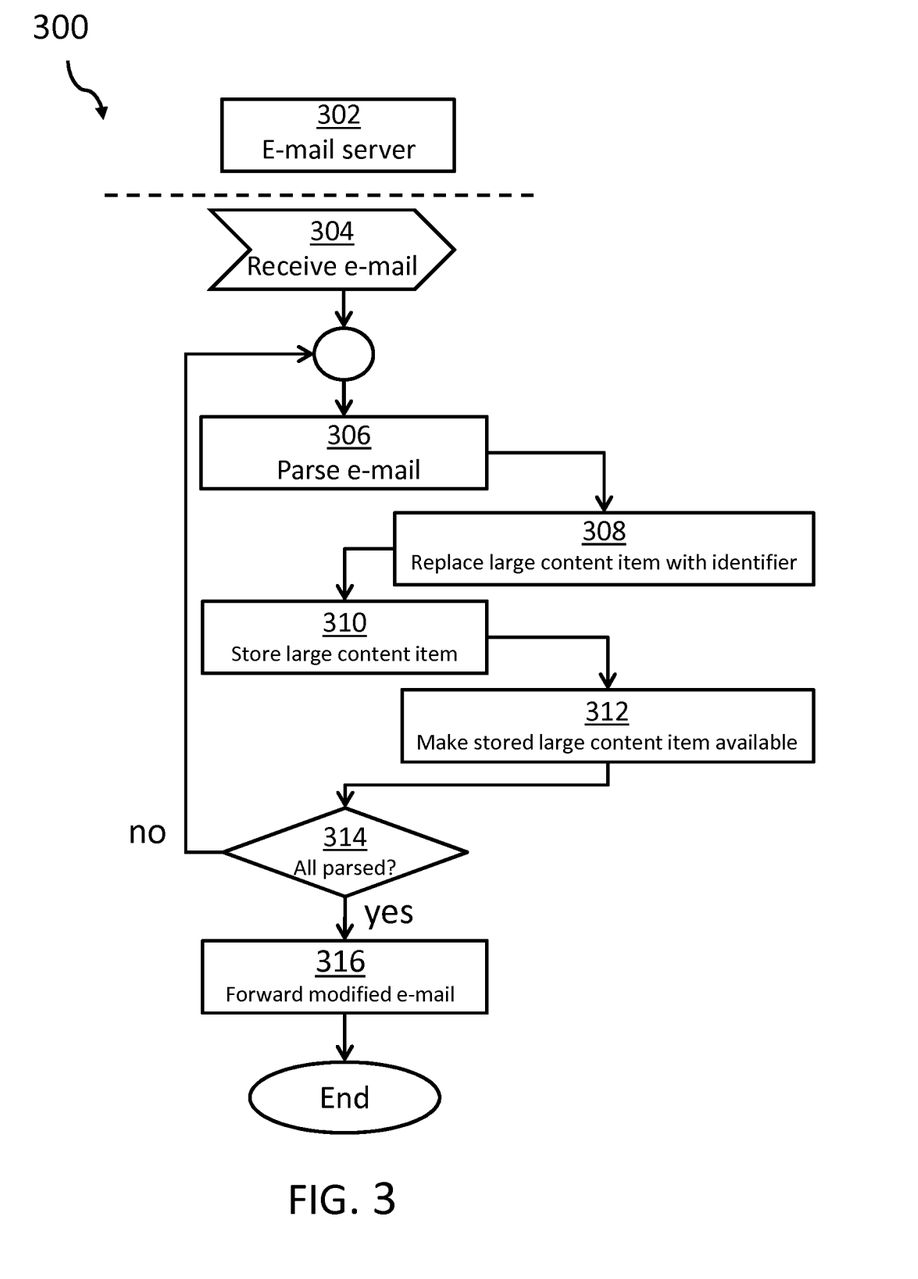
FIG. 3 is a flowchart illustrating aspects of a method for handling e-mail communication by an e-mail server from a perspective of an enhanced e-mail server, according to an embodiment.

FIG. 3 is a flowchart illustrating aspects of an exemplary method for handling e-mail communication by an e-mail server from a perspective 300 of the e-mail server (e.g., enhanced e-mail server 302), according to an embodiment. At 304, enhanced e-mail server 302 may receive the original e-mail (e.g., sent by sender 202 in FIG. 2). At 306, the e-mail may be parsed for a large content item. At 308, the large content item may be replaced with an identifier (e.g., a URL) comprising a thread-ID, a content-ID, and a security token. At 310, the large content item may be stored at a local or remote storage, e.g., in a database. At 312, the stored large content item may be made available via a Web-server (and may be accessible via the identifier). At 314, a determination may be made as to whether the e-mail has been parsed completely. If the parsing is not complete, the process flow may go back to step 306 to parse the remaining part of the e-mail content for a next large content item. If the parsing is complete, at 316, the e-mail may be forwarded (e.g., sent) in a modified form to the recipient(s).

Figure 4:
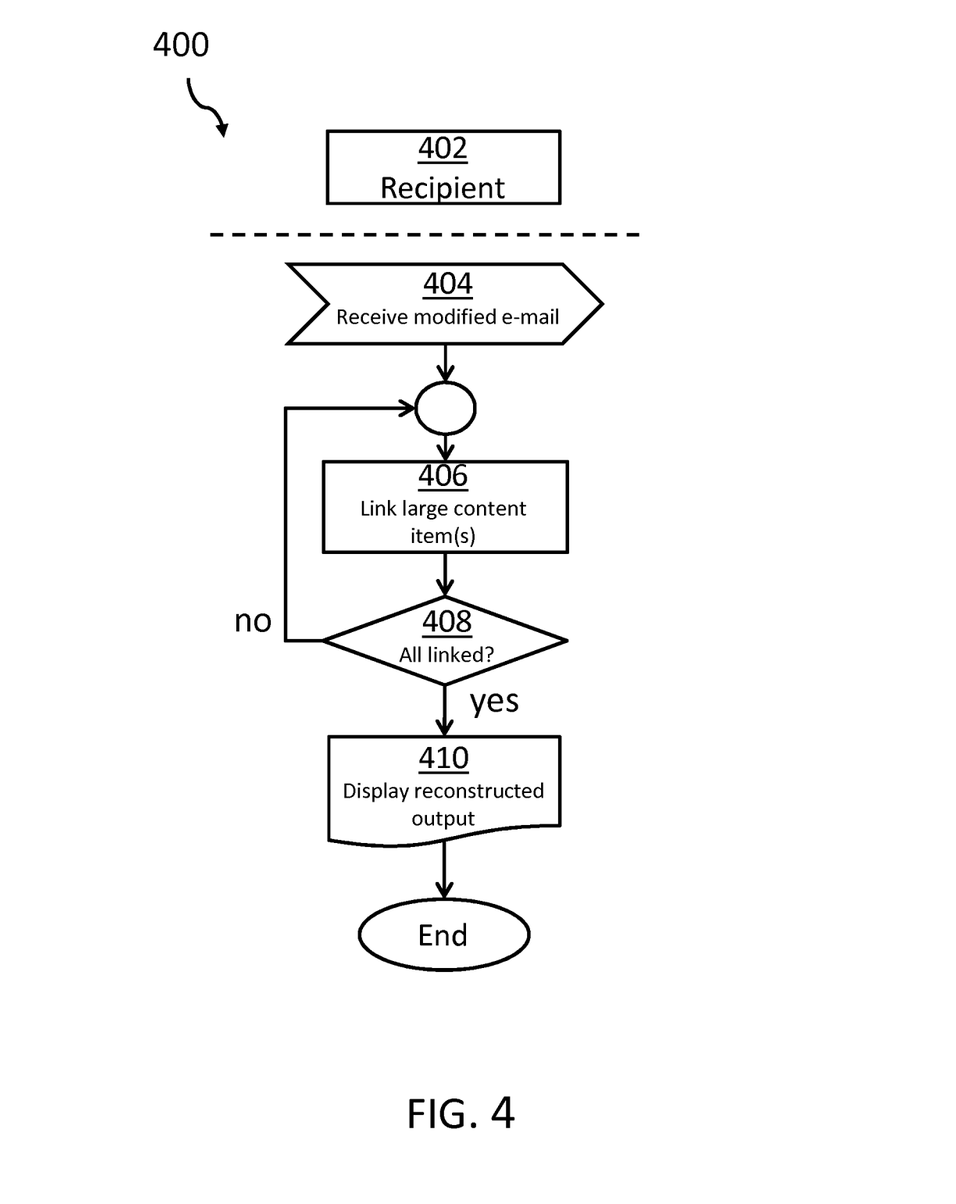
FIG. 4 is a flowchart illustrating aspects of a method for handling e-mail communication by an e-mail server from a perspective of the recipient, according to an embodiment.

FIG. 4 is a flowchart illustrating aspects of a method for handling e-mail communication by an e-mail server from a perspective 400 of the recipient 402, according to an embodiment. At 404, the recipient may receive the modified e-mail. At 406, the large content item(s) may be linked, from the remote storage database on the weblog server using the thread-ID, the content-ID and the security token to the modified e-mail. This linking may be undetectable to the recipient (i.e., not apparent or visible to the recipient). At 408, a determination may be made as to whether all large content items have been linked. If not all large content items have been linked, the process flow goes back to step 406 to link the next large content item of the e-mail. If all the large content items (from the original e-mail) have been linked to the modified e-mail, at 410, an output may be reconstructed or rendered to be viewed by the recipient.

Figure 5:
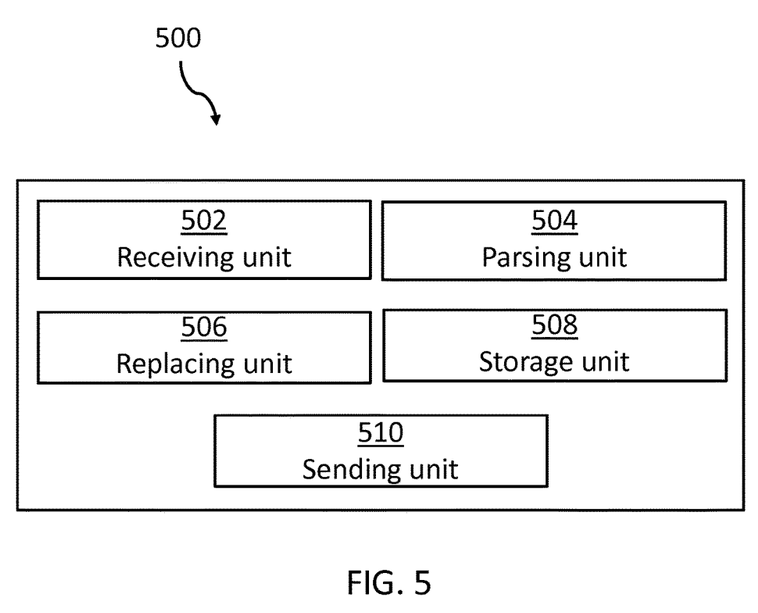
FIG. 5 is a block diagram illustrating an enhanced e-mail server for handling e-mail communication, according to an embodiment.

FIG. 5 shows a block diagram of an exemplary e-mail server 500 (which may be enhanced e-mail server 300 in FIG. 3) for handling e-mail communication, according to an embodiment. E-mail server 500 may include a receiving unit 502 adapted for a reception of an e-mail, a parsing unit 504 adapted for parsing the received e-mail for large content items and a replacing unit 506 adapted for a replacement of an identified large content item within the received e-mail by an identifier thereby creating a modified e-mail. The e-mail server 500 may also include a storage unit 508 adapted for storing the identified large content item. The stored large content item may form a basis for a weblog (not shown) and a sending unit 510 adapted for sending the modified e-mail, in which the identified large content item is replaced by the identifier. Additionally, the receiving unit 502 may also be adapted for receiving a reply e-mail to the modified e-mail, and content of the reply e-mail may build an extension to the weblog.

The receiving unit 502 may also be adapted for receiving a reply e-mail to the modified e-mail, and the e-mail server 500 may be adapted for using the identifier to position content of the reply e-mail in the weblog.

Figure 6:
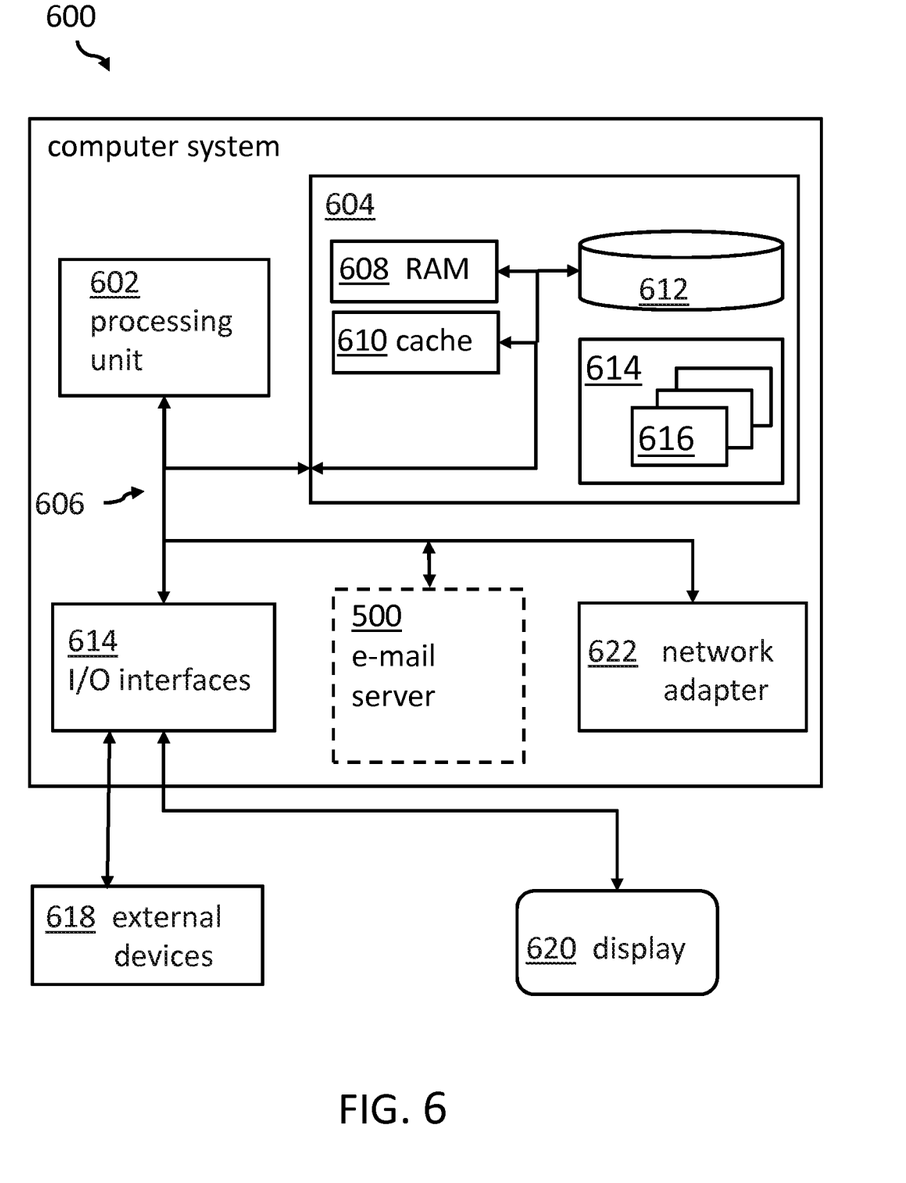
FIG. 6 is a block diagram illustrating a computing node, according to an embodiment.

Embodiments of the invention may be implemented together with any type of computer, known or contemplated, regardless of the platform being suitable for storing and/or executing program code. With reference to FIG. 6, an exemplary computing system 600 suitable for executing the proposed method is shown.

The computing system 600 is only one example of a suitable computer system and is not intended to suggest any limitation as to the scope of use or functionality of embodiments of the invention described herein. Regardless, computer system 600 is capable of being implemented and/or performing any of the functionality set forth hereinabove. In the computer system 600, there are components, which are operational with numerous other general purpose or special purpose computing system environments or configurations. Examples of well-known computing systems, environments, and/or configurations that may be suitable for use with computer system/server 600 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 600 may be described in the general context of computer system-executable instructions, such as program modules, being executed by a computer system 600. Generally, program modules may include routines, programs, objects, components, logic, data structures, and so on that perform particular tasks or implement particular abstract data types. Computer system/server 600 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 600 is shown in the form of a general-purpose computing device. The components of computer system/server 600 may include, but are not limited to, one or more processors or processing units 602, a system memory 604, and a bus 606 that couples various system components including system memory 604 to the processor 602. Bus 606 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 600 typically includes a variety of computer system readable media. Such media may be any available media that is accessible by computer system/server 600, and it includes both, volatile and non-volatile media, removable and non-removable media.

The system memory 604 may include computer system readable media in the form of volatile memory, such as random access memory (RAM) 608 and/or cache memory 610. Computer system/server 600 may further include other removable/non-removable, volatile/non-volatile computer system storage media. By way of example only, storage system 612 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 606 by one or more data media interfaces. As will be further depicted and described below, memory 604 may include at least one program product having a set (e.g., at least one) of program modules that are configured to carry out the functions of embodiments of the invention.

Program/utility 614, having a set (at least one) of program modules 616, may be stored in memory 604 by way of example, and not limitation, as well as an operating system, one or more application programs, other program modules, and program data. Each of the operating system, one or more application programs, other program modules, and program data or some combination thereof, may include an implementation of a networking environment. Program modules 616 generally carry out the functions and/or methodologies of embodiments of the invention as described herein.

The computer system/server 600 may also communicate with one or more external devices 618 such as a keyboard, a pointing device, a display 620, etc.; one or more devices that enable a user to interact with computer system/server 600; and/or any devices (e.g., network card, modem, etc.) that enable computer system/server 600 to communicate with one or more other computing devices. Such communication can occur via Input/Output (I/O) interfaces 614. Still yet, computer system/server 600 may communicate with one or more networks such as a local area network (LAN), a general wide area network (WAN), and/or a public network (e.g., the Internet) via network adapter 622. As depicted, network adapter 622 may communicate with the other components of computer system/server 600 via bus 606. It should be understood that although not shown, other hardware and/or software components could be used in conjunction with computer system/server 600. Examples, include, but are not limited to: microcode, device drivers, redundant processing units, external disk drive arrays, RAID systems, tape drives, and data archival storage systems, etc.

Additionally, the e-mail server disclosed herein (e.g., e-mail server 500) for handling e-mail communication may be attached to the bus system 606.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for handling e-mail communication by an e-mail server, the method comprising:
   receiving an e-mail by the e-mail server;
   determining a number of recipients for the e-mail;
   based on determining the number of recipients being above a recipient threshold number:
      parsing the e-mail to identify a large content item within the e-mail;
      generating a modified e-mail by replacing the large content item within the e-mail with an identifier, wherein the identifier comprises a thread identifier, a content identifier, and a nonce, wherein the thread identifier is used to position the large content in a weblog, wherein the content identifier is a series of characters to identify a specific content item of the large item, and wherein the nonce is formed by an encryption function for identification and securing access to the large content; and
      storing the large content item, wherein the large content item forms a basis for the weblog associated with the identifier, wherein the weblog comprises one or more large content items that are arranged in reverse chronological order;
   sending the modified e-mail; and
   receiving a reply e-mail to the modified e-mail, wherein content of the reply e-mail builds an extension to the weblog, and wherein the reply e-mail is generated by replacing the identifier with the large content making the replacement undetectable to a recipient.

2. The method according to claim 1, wherein the identifier comprises at least one of a thread identifier, a content identifier, and a security token, and wherein the thread identifier is associated with a position in the weblog associated with the content of the reply e-mail.

3. The method according to claim 2, wherein the security token is a nonce formed using an encryption function based on an identifier of a recipient of the modified e-mail, an identifier of said large content item, and a time-stamp associated with a sending time of the modified e-mail by the e-mail server.

4. The method according to claim 1, wherein the e-mail server communicates using simple mail transfer protocol (SMTP), and wherein a corresponding RCTP command recipient is a recipient of the modified e-mail and a corresponding TO: field header associated with the modified e-mail refers to a replaced recipient at the e-mail server.

5. The method according to claim 1, wherein the large content item is stored as part of an e-mail client.

6. The method according to claim 3, wherein an access request to the large content item is granted by the e-mail server after validation of the access request by the e-mail server, wherein the validation of the access request is based on reconstructing an outcome of the encryption function using the recipient of the modified e-mail, the identifier of said large content item and the time-stamp associated with a sending time of the modified e-mail by the e-mail server.

7. The method according to claim 1, wherein the parsing further comprises determining a size of the large content item, and wherein the replacing the large content item is based on at least one of:
   the number of recipients being above a recipient threshold number; and
   the size of the large content item being above a threshold size.

8. The method according to claim 1, wherein the e-mail comprises an e-mail body, and wherein the e-mail body is the large content item.

9. The method according to claim 1, wherein the e-mail server receives an unsubscribe command for a corresponding e-mail thread associated with the weblog from a recipient of the corresponding e-mail thread, and, based on the unsubscribe command, the e-mail server removes the recipient of the corresponding e-mail thread from a group of recipients of a subsequent modified e-mail associated with the corresponding e-mail thread.

10. The method according to claim 1, wherein the weblog is accessible to one or more recipients of the modified e-mail and one or more members of an e-mail discussion associated with the modified e-mail, wherein the weblog comprises one or more entries associated with the identifier, and wherein access to the one or more entries is limited to the one or more recipients of the modified e-mail.

11. A computer system for handling e-mail communication by an e-mail server, the computer system comprising:
   at least one processing unit;
   at least one computer readable memory;
   at least one computer readable tangible, non-transitory storage medium; and
   program instructions stored on the at least one computer readable tangible, non-transitory storage medium for execution by the at least one processing unit via the at least one computer readable memory, wherein the program instructions comprise program instructions for:
   receiving an e-mail by the e-mail server;
   determining a number of recipients for the e-mail;
   based on determining the number of recipients being above a recipient threshold number:
   parsing the e-mail to identify a large content item within the e-mail;
   generating a modified e-mail by replacing the large content item within the e-mail with an identifier, wherein the identifier comprises a thread identifier, a content identifier, and a nonce, wherein the thread identifier is used to position the large content in a weblog, wherein the content identifier is a series of characters to identify a specific content item of the large item, and wherein the nonce is formed by an encryption function for identification and securing access to the large content; and
   storing the large content item, wherein the large content item forms a basis for the weblog associated with the identifier, wherein the weblog comprises the large content that is arranged in reverse chronological order;
   sending the modified e-mail; and
   receiving a reply e-mail to the modified e-mail, wherein content of the reply e-mail builds an extension to the weblog, and wherein the reply e-mail is generated by replacing the identifier with the large content making the replacement undetectable to a recipient.

12. The computer system according to claim 11, wherein the identifier comprises at least one of a thread identifier, a content identifier, and a security token, and wherein the thread identifier is associated with a position in the weblog associated with the content of the reply e-mail.

13. The computer system according to claim 12, wherein the security token is a nonce formed using an encryption function based on an identifier of a recipient of the modified e-mail, an identifier of said large content item, and a time-stamp associated with a sending time of the modified e-mail by the e-mail server.

14. The computer system according to claim 11, wherein the e-mail server communicates using simple mail transfer protocol (SMTP), and wherein a corresponding RCTP command recipient is a recipient of the modified e-mail and a corresponding TO: field header associated with the modified e-mail refers to a replaced recipient at the e-mail server.

15. The computer system according to claim 11, wherein the large content item is stored as part of an e-mail client.

16. The computer system according to claim 13, wherein an access request to the large content item is granted by the e-mail server after validation of the access request by the e-mail server, wherein the validation of the access request is based on reconstructing an outcome of the encryption function using the recipient of the modified e-mail, the identifier of said large content item and the time-stamp associated with a sending time of the modified e-mail by the e-mail server.

17. The computer system according to claim 11, wherein the parsing further comprises determining a size of the large content item, and wherein the replacing the large content item is based on at least one of:
   a number of recipients being above a recipient threshold number; and
   a size of the large content item being above a threshold size.

18. The computer system according to claim 11, wherein the e-mail comprises an e-mail body, and wherein the e-mail body is the large content item.

19. The computer system according to claim 11, wherein the e-mail server receives an unsubscribe command for a corresponding e-mail thread associated with the weblog from a recipient of the corresponding e-mail thread, and, based on the unsubscribe command, the e-mail server removes the recipient of the corresponding e-mail thread from a group of recipients of a subsequent modified e-mail associated with the corresponding e-mail thread.

20. A computer program product for handling e-mail communication by an e-mail server, the computer program product comprising at least one computer readable non-transitory storage medium having computer readable program instructions thereon for execution by a processor, the computer readable program instructions comprising program instructions for:
   receiving an e-mail by the e-mail server;
   determining a number of recipients for the e-mail;
   based on determining the number of recipients being above a recipient threshold number:
   parsing the e-mail to identify a large content item within the e-mail;
   generating a modified e-mail by replacing the large content item within the e-mail with an identifier, wherein the identifier comprises a thread identifier, a content identifier, and a nonce, wherein the thread identifier is used to position the large content in a weblog, wherein the content identifier is a series of characters to identify a specific content item of the large item, and wherein the nonce is formed by an encryption function for identification and securing access to the large content; and
   storing the large content item, wherein the large content item forms a basis for the weblog associated with the identifier, wherein the weblog comprises the large content that is arranged in reverse chronological order;
   sending the modified e-mail; and
   receiving a reply e-mail to the modified e-mail, wherein content of the reply e-mail builds an extension to the weblog, and wherein the reply e-mail is generated by replacing the identifier with the large content making the replacement undetectable to a recipient.

\* \* \* \* \*